United States Patent [19]

Yashiro

[11] Patent Number: 4,475,121
[45] Date of Patent: Oct. 2, 1984

[54] POLLING PATTERN GENERATOR FOR CATV SYSTEM

[75] Inventor: Kenji Yashiro, Tokyo, Japan

[73] Assignee: Pioneer Electronic Corporation, Tokyo, Japan

[21] Appl. No.: 269,164

[22] Filed: Jun. 1, 1981

[30] Foreign Application Priority Data

May 30, 1980 [JP] Japan ................... 55-73585

[51] Int. Cl.³ .............................. H04N 7/10
[52] U.S. Cl. .................. 358/84; 340/825.3; 455/2
[58] Field of Search .............. 340/825.3; 324/73 R; 455/2, 3, 4, 5; 358/84, 86

[56] References Cited

U.S. PATENT DOCUMENTS 4,156,847  5/1979  Tazawa et al. ................... 455/5
4,192,451  3/1980  Swerling et al. ................. 324/73 R
4,365,267  12/1982  Tsuda ............................ 358/86

Primary Examiner—Joseph A. Orsino, Jr.
Attorney, Agent, or Firm—Sughrue, Mion, Zinn, Macpeak, and Seas

[57] ABSTRACT

A polling pattern generator system for use in a CATV system including a polling pattern generator and a passive data monitor. The polling pattern generator periodically generates polling pattern signals each of which has a specific address code for calling a corresponding terminal unit and a command code for requesting a designated answer from the called terminal unit. The passive data monitor compares an up data signal outputted from the terminal unit in response to the command code with the designated answer requested by the command code and judges whether or not an operational state of the terminal unit is acceptable from the resultant comparison output. The passive data monitor sets the address code in the designated terminal unit.

3 Claims, 9 Drawing Figures

POLLING PATTERN GENERATOR FOR CATV SYSTEM

BACKGROUND OF THE INVENTION

The present invention relates to a CATV system. More specifically, the invention to a polling signal generator in a CATV system for periodically transmitting a polling signal to terminal units to initiate the transmission of specific data from the terminal units.

A CATV system serves to transmit a variety of programs to television sets of terminal units installed in subscriber's homes through coaxial cables. Many CATV systems are capable of performing bidirectional simultaneous communications in addition to program transmission wherein the center simultaneously transmits information to a number of the terminal units and receives information back from them. Specifically, predetermined functions in the terminal units have to be periodically or irregularly polled. This polling operation is conducted by transmitting a down data signal to the terminal units, receiving up signals in reply to the down data signal and comparing the command in the down data signal therewith. However, in order to generate such a down data signal for polling the terminal units, a large-sized computer has heretofore been necessary. Such a computer cannot easily be transported around the system, as would be desirable.

It is thus an object of the present invention to provide a polling pattern generator for a CATV system which eliminates the aforementioned drawbacks, is portable, has a simple construction, and can periodically generate a polling pattern for polling the terminal units.

SUMMARY OF THE INVENTION

In accordance with this and other objects of the invention, there is provided a terminal unit checking system for a CATV system having a single center and a number of terminal units connected to the single center for transmitting television programs through cables to the terminal units. The terminal units checking system includes polling pattern generator means for periodically generating polling pattern signals. Each polling pattern signal has a specific address code for calling a corresponding terminal unit and a command code for requesting a designated answer for the called terminal unit. A passive data monitor monitor means compares an up data signal outputted by the terminal unit in response to the command code with the designated answer requested by the command code for judging an operational state of the terminal unit from a resultant comparison output. The passive data monitor includes means for arbitrarily setting an address code. Also, included is an address setting means for setting the same address code set in the passive data monitor means in the terminal unit. The passive data monitor means is provided between the center and the terminal unit while the polling pattern generator means is provided between the center and the passive data modulator means. The polling pattern signal is transmitted from the polling pattern generator means through a cable to the terminal unit. When an address code of the polling pattern signal is the same as an address code set in the terminal unit by the address setting means, an up data signal outputted from the terminal unit in response to the command code is applied to the passive data monitor means and therein a designated answer requested by the command code in the up data signal thus outputted from the terminal unit are compared to determine whether an operational state of the terminal unit is acceptable.

DESCRIPTION OF THE PREFERRED EMBODIMENTS

Figure 1:
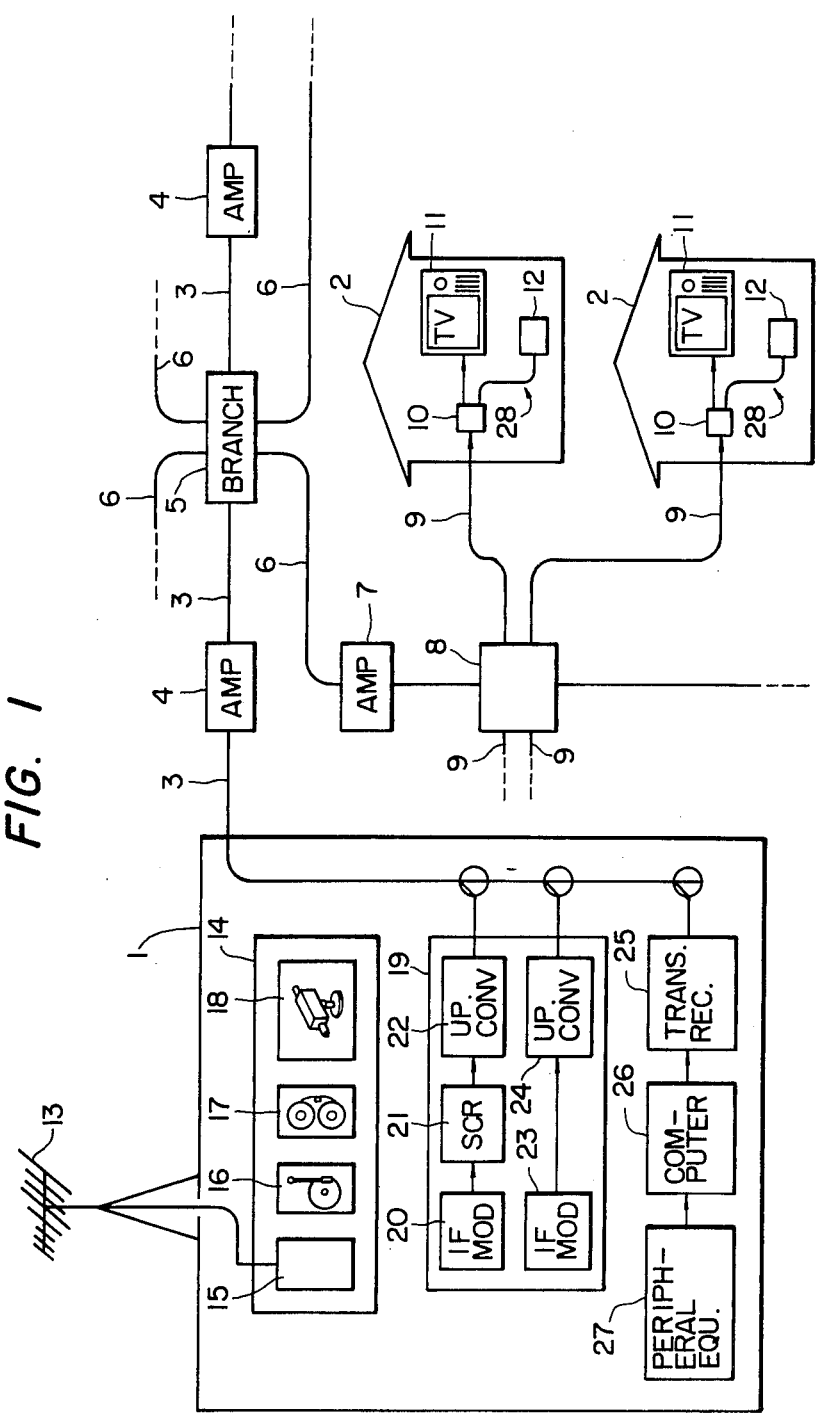
FIG. 1 is an explanatory view showing a CATV system to which the invention is applied.

A CATV system in which the invention is used to advantage will be described with reference to FIG. 1. The CATV system includes a single center 1 and terminal units 28 which are provided, for example, in several tens of thousands of subscribers' homes. The center 1 is connected through coaxial cables to the terminal units 28 in the subscribers' homes 2. A main cable 3 extends from the center 1 and main cable amplifiers 4 and branching units 5 are provided at predetermined positions on the main cable 3. A plurality of branch cables 6 extend from each branching unit 5. Extension amplifiers 7 and tap-off units 8 are provided at predetermined points on the branch cables 6. Each tap-off unit 8 is connected to branch lines 9 which extend to the terminal units 28 in the subscribers' homes 2. Each terminal unit 28 includes a main unit 10, a television set 11 and a control unit 12. The branch line 9 is connected to the main unit 10 which is in turn connected to the television set 11 and to the control unit 12. As is apparent from the above description, the main cable 3 extending from the center is branched into a first plurality of branch cables which are further branched into a second plurality of branch lines which are finally connected to the terminal units 28.

A signal receiving antenna 13 is installed outside the center 1. The antenna 13 is connected to a demodulator 15 in a source group 14 in the center 1. The source group 14 further includes a video disc player 16, a video tape recorder 17 and a studio 18. The output signals of the source group 14 are applied to a modulation output section 19 composed of two systems. One of the two systems includes an IF modulator circuit 20, a scramble circuit 21, and an up-converter circuit 22 while the other system includes an IF modulator circuit 23 and an up-converter circuit 24. The outputs of the up-converters 22 and 24 are connected to the main cable 3 to which a data transceiver 25 is connected for data communication between the center 1 and each main unit 10. The data transceiver 25 is connected to a computer 26 which is connected to a peripheral unit 27 such as a printer or a display unit.

The operation of the CATV thus constructed will be described.

First, the power switch of the television set 11 is turned on. With the television set 11 set to a particular unused channel, the control unit 12 is operated so that the frequency of a desired channel to be received is converted into that of the unused channel. The channels which can be selected by the control unit 12 as described above can be classified into three groups of channels for (A) retransmission programs in which television signals from local station are received without modification, (B) independent programs (free of charge), and (C) chargeable programs. Each group is allocated ten channels, and therefore any of thirty channels can be selected by operating the control unit 12.

(A) Retransmission programs

Television signals received by the antenna 13 are demodulated by the demodulator 15 and then applied to the modulation output section 19. The signal thus applied is modulated by the IF modulator circuit 23. The frequency of the signal thus modulated is increased to a predetermined frequency by the up-converter circuit 24 according to a determined frequency allocation scheme. That is, it is assigned to a predetermined channel. The resultant signal is applied through the main cable 3, the branch cable 6, and the branch line 9 to the television sets 11.

(B) Independent programs

The independent programs include weather forecast programs, news programs, and the like. In the case of programs recorded by the video disc player 16 or the video tape recorder 17 or in the case of live programs produced in the studio 18, the video signal is modulated by the IF modulator circuit 23 and the frequency of the signal thus modulated is increased to that of a predetermined channel by the up-converter circuit 24. The resultant signal is applied to the main cable 3. Reception of these programs is free of charge irrespective of the number of times of program reception and the period of time used for program reception. That is, the programs can be received for the basic monthly charge which is paid by the subscriber.

(C) Chargeable programs

The chargeable programs include new movie programs, special programs, and the like. In the case of programs provided by the video disc player 16 or the video tape recorder 17 or in the case of live programs produced in the studio 18, the video signal is modulated by the IF modulator circuit and is then processed by the scrambler circuit 21 so that they cannot be reproduced without special signal processing. Then, the frequency of the signal is increased to that of a pedetermined designated channel, and is then applied to the main cable 3. In order to receive the chargeable programs, the video signal must be descrambled by the main unit 10 in the subscriber's home 2 so that a regular image appears in the television set 11. The subscriber is charged for the reception of the chargeable programs. That is, predetermined charges are summed, and he is requested to pay a special charge at a measured rate in addition to the monthly basic charge.

As described above, the center 1 is connected through the coaxial cables to the terminal units in the subscribers' homes 2. However, in order to charge the subscribers for the reception of the chargeable programs, it is absolutely necessary to detect which subscribers receive which channels. That is, it is necessary to detect the channels which have been selected by the subscribers at various times. In order to meet this requirement, the data transceiver 25 outputs a retrieving signal at predetermined time intervals so that the terminal units 28 are called with their assigned address numbers. That is, the channels received by the terminal units at the time of transmission of the retrieving signal are detected, this operation being referred to as "polling". In response to this polling, each terminal unit 28 answers the data transceiver 25 with data representative of the channel which was received by the terminal unit at the time of polling. Various reception and transmission data for the data transceiver 25 are arranged and stored by the computer 26 and are displayed or printed out by the peripheral unit 27. The polling operation is carried out at predetermined time intervals of several seconds to several tens of second and therefore audience ratings can be readily calculated.

Sometimes, the subscribers may participate in the production of programs. In this case, by operating the control units 12, they can answer to the programs while watching the television sets 11. The answers are transmitted through the coaxial cables to the center 1.

Figure 2:
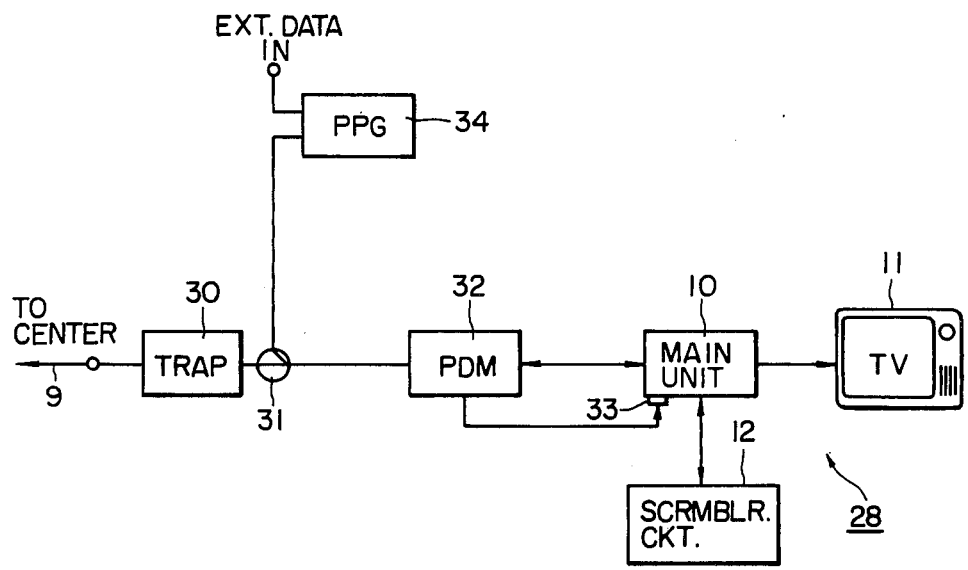
FIG. 2 is a block diagram showing the installation of a polling pattern generator.

FIG. 2 shows in block diagram form a preferred embodiment of a polling pattern generator of the invention. A trap 30 for blocking the down data signal but which passes the video signal, has an input connected to a branch line 9. To the trap 30 is connected through a mixer 31 a passive data monitor 32, hereinafter abbreviated to "PDM". The output of the PDM 32 is connected to a main unit 10. An address setting unit 33, which will be hereinafter described in greater detail, is detachably provided at the main unit 10, and is connected through a cable to the PDM 32. Reference numeral 34 indicates a polling pattern generator, hereinafter abbreviated to "PPG". The output of the PPG 34 is connected to the mixer 31. The PPG 34 produces a polling down data signal either by itself or in response to an external data unit coupled in at an external data input terminal. The PPG 34 can thus poll the respective terminal units 28 through the connection provided between the branch line 9 and the main unit 10 in FIG. 1.

In this apparatus, a down data signal, which will hereinafter be termed an "FSK signal" as it is a frequency shift keyed signal, and video signals and the like are transmitted from the center 1 and are received at the trap 30. Only the video signals are transmitted through the trap 30, the PDM 32 and the main unit 10 to television sets 11. In this manner, the television set 11 can reproduce the video and audio signals in the ordinary manner even during polling.

The PPG 34 normally generates a polling pattern signal having in combination an address code and a command code in the same transmission mode as used by the center 1. The polling signals incorporate all command codes in combination with respective address data which are repeatedly transmitted in sequence from the polling generator. The polling signals are transmitted through the mixer 31 to the PDM 32. The terminal unit 28 is set to respond to a specific address code, in this case, set by the PDM 32. When the terminal unit 28 responds in this manner, the PDM 32 can determine the content of an answer from the terminal unit 28. The address for the main unit 10 can be freely selected and set by the address setting unit 33 in the PDM 32. The construction and operation of the address setting unit 33 will be hereinafter described in greater detail.

When the address is set in the main unit 10, the main unit 10 responds only to when that of the address, as set by the address setting unit 33, outputting as an answer an up data signal corresponding to the command code which accompanies the address code to the PDM 32. The PDM 32 compares the up data signal with an answer signal from the main unit 10 and thus determines whether a normal operation or an erroneous operation has taken place according to whether or not the received up data signal agrees with the answer signal.

Figure 3:
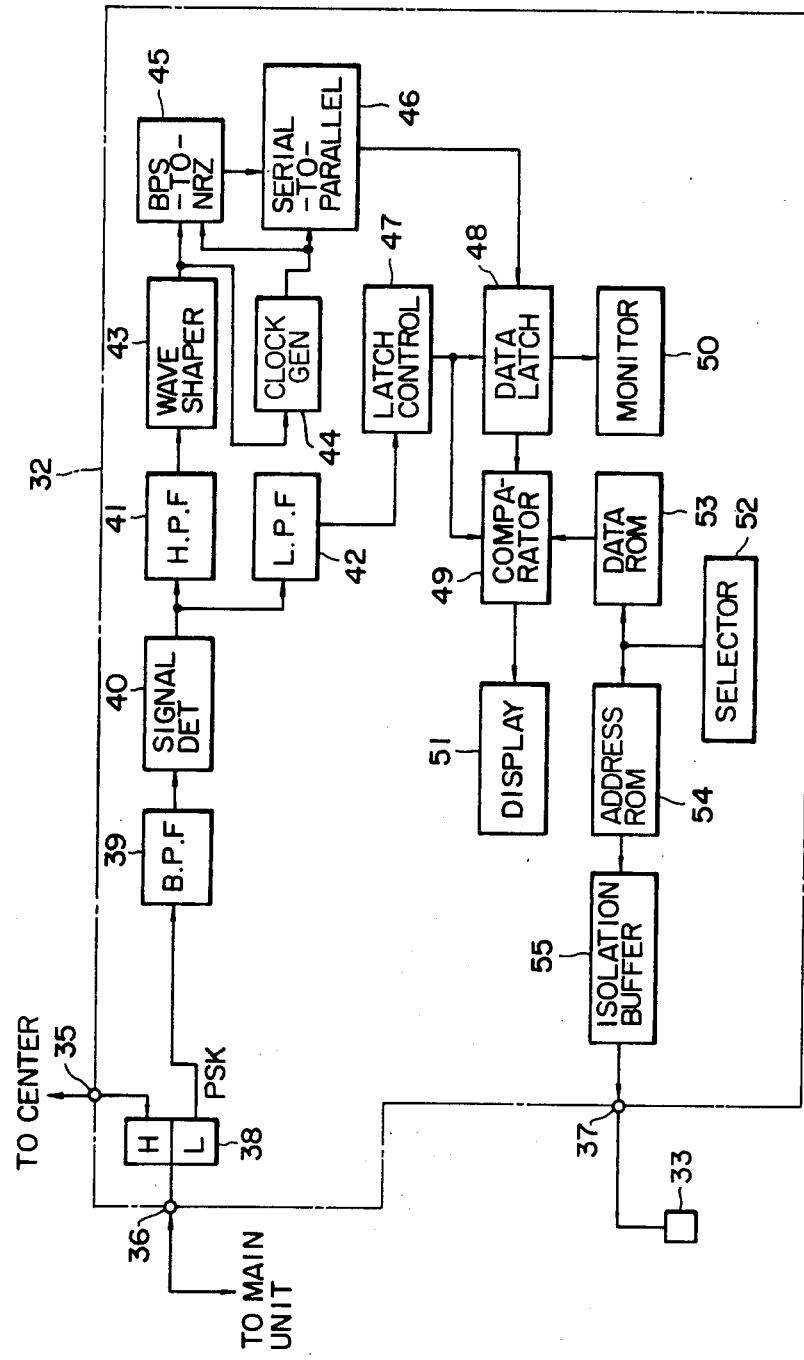
FIG. 3 is a block diagram of a passive data monitor of the invention.

FIG. 3 is a block diagram of the PDM 32. The PDM 32 has an input terminal 35 connected to the mixer, an output terminal 36 connected to the main unit 10, and an address output terminal 37 connected to the address setting unit 33. The output terminal of a signal splitter 38 is connected to the output terminal 36 while the high side terminal thereof is connected to the input terminal 35 and the low side terminal to a bandpass filter 39. The output of the bandpass filter 39 is connected to a signal detector 40. The output of the signal detector 40 is connected to inputs of both a high-pass filter 41 and a low-pass filter 42. The output of the high-pass filter 41 is connected through a wave shaping circuit 43 to a clock generator 44. A BPS-to-NRZ code converter circuit 45 receives the output of the wave shaping circuit 43 and the output of the clock generator 44 converting the BPS code into the NRZ code. A serial-to-parallel converter circuit 46 converts the output of the converter circuit 45 to a parallel signal. The output of the low-pass filter 42 is connected to a latch control circuit 47. The output of the latch control circuit 47 is connected to both a data latch circuit 48 and a comparator 49. The output of the converter circuit 46 is connected to the data latch circuit 48. The output of the data latch circuit 48 is connected to both the comparator 49 and a monitor circuit 50. The output of the comparator 49 is connected to a display unit 41, which may be an LED device or the like.

Reference numeral 52 depicts a selector circuit which can be set manually. The output of the selector circuit 52 is connected to the inputs of both a data ROM 53 and an address ROM 54 which store predetermined data and addresses, respectively. The output of the data ROM 53 is connected to the comparator 49. The output of the address ROM 54 is connected through an isolation buffer circuit 55 to the address output terminal 37. The address setting unit 33 is connected to the address output terminal 37.

Figure 4:
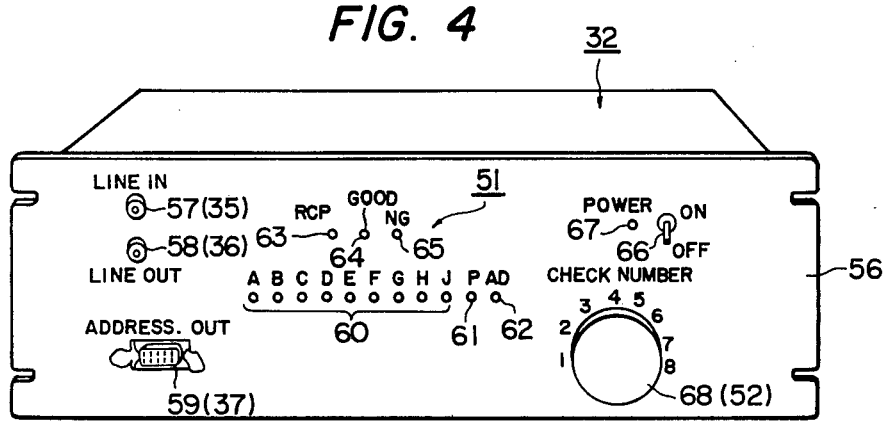
FIG. 4 is a front view showing the panel of the passive data monitor.

FIG. 4 shows a front panel of the PDM 32. The front panel has connectors 57 and 58 for the input terminal 35 and the output terminal 36, respectively, on the upper leftside portion, a multiple pin connector 59 for the address output terminal 37 below the connector 58, and LEDs (light emission diodes) 60 through 65 as the monitor circuit 50 and the display unit 51 in the vicinity of the central portion. The LEDs 60 to 62 for the monitor circuit are aligned rectilinearly horizontally. The characters A through J placed above the LEDs 60 indicate answer data from the terminal units. The character above the LED 61 corresponds to a parity bit. AD designated above the LED 62 indicates an additional bit. The LEDs 63 through 65 for displaying the terminal units condition are arranged above the LEDs 60 through 62. The LED 63 identified by the characters RCP indicates that an up signal, hereinafter abbreviated as "PSK" as it is phase shift keyed signal, from the main unit 10 has been received. The LED 64, identified with the characters GOOD, indicates that the PSK signal is normal. The LED 65 labelled NG indicates that the PSK signal is in error.

The panel 56 also incorporates a power switch 66 and a power lamp 67 for indicating the on or off state of the power switch 66 on the upper rightside portion. The panel also has a check number knob 68, which is coupled to a rotary switch, positioned under the power switch 66. This rotary switch is used in the selector circuit 52.

Figure 5:
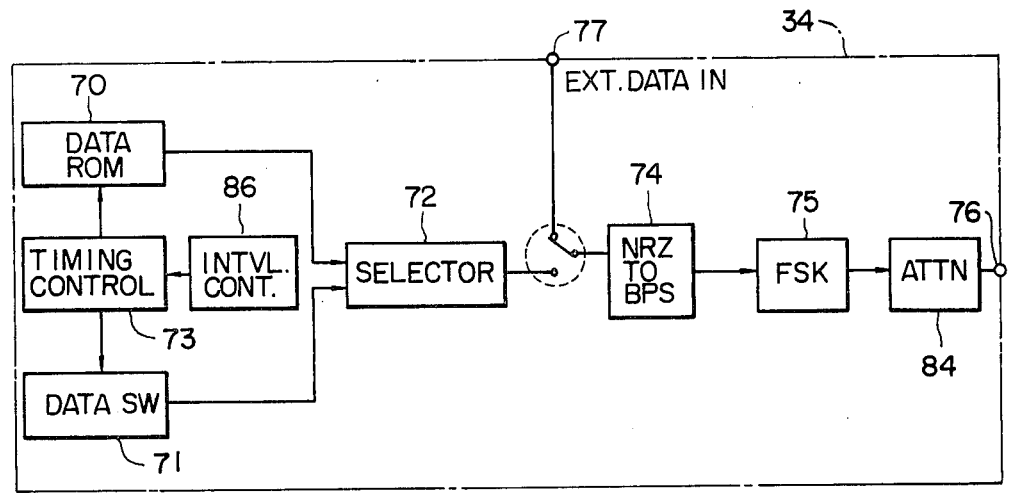
FIG. 5 is a block diagram showing a polling pattern generator of the invention.

FIG. 5 is a block diagram showing the circuit arrangement of the aforementioned PPG 34. The outputs of a data ROM 70 in which is stored a variety of address codes and command codes and output of a data switch 71 which is used to set the address code and the command code manually are connected to a selector circuit 72. A control signal from a timing control circuit 73 which determines the timing for producing data is connected to both the data ROM 70 and the data switch 71. The output of the selector circuit 72 is connected to an NRZ-to-BPS code converter circuit 74 for converting the NRZ code to the PBS code. The output of the converter circuit 74 is connected to an FSK signal transmitter circuit 75. The output of the transmitter circuit 75 is connected to an FSK output terminal 76. An external data input terminal 77 for inputting data from an external device is connected directly to the converter circuit 74.

Figure 6:
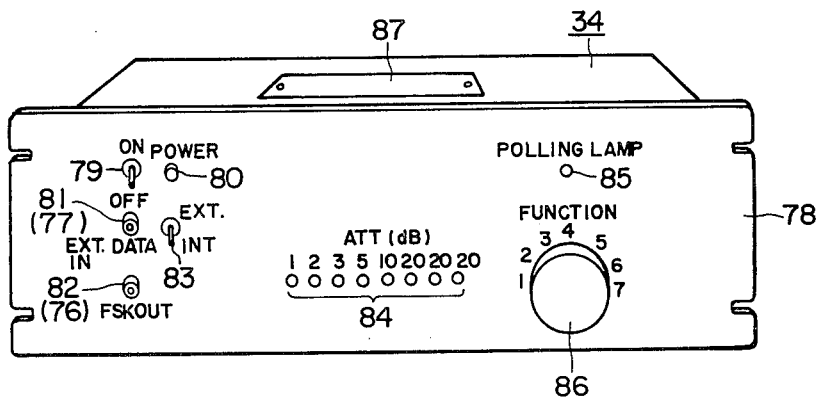
FIG. 6 is a front view of the panel of the polling pattern generator of FIG. 5.

FIG. 6 shows the outer appearance of the PPG 34. A panel 78 at the front of this unit has a power switch 79 and a power lamp 80 for indicating the on or off state of the power switch 79 on the upper left portion thereof, connectors 81 and 82 forming respectively the external input terminal 77 and the output terminal 76, below the power switch 79, and a switch 83 for selecting one of the external input data and the internal data located on the right of the panel. The panel 78 also incorporates attenuation switches 84 for setting output signal levels aligned in a row horizontally on the central portion. These attenuation switches 84 are a push-button type and are used for determining the output signal level. The panel also has a polling lamp 85 for indicating polling and a function knob 86 for varying the polling speed on the right side. Also as seen in FIG. 6, the PPG 35 incorporates a detachable cover 87 on the upper central portion and switch groups for setting desired data under the cover 87.

Figure 7:
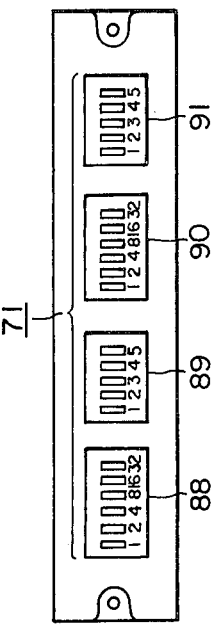
FIG. 7 is a plan view showing data switch groups used in the polling pattern generator of FIG. 5.

FIG. 7 shows the construction of the switch groups to which access is made by opening the cover 87 of the PPG 34. The switch groups correspond to the aforementioned data switch 71. The individual switches of the four switch groups 88, 89, 90 and 91 can set to either "H" or "L" corresponding to high and low logic levels. The switches 88 and 90 have six individual switches corresponding to six digits while the switch groups 89 and 90 have five switches corresponding to five digits. The switch groups 88 and 89 are used to set a group address and the switch 90 is used to set an individual address. The switch 91 is used to set a command.

Figure 8:
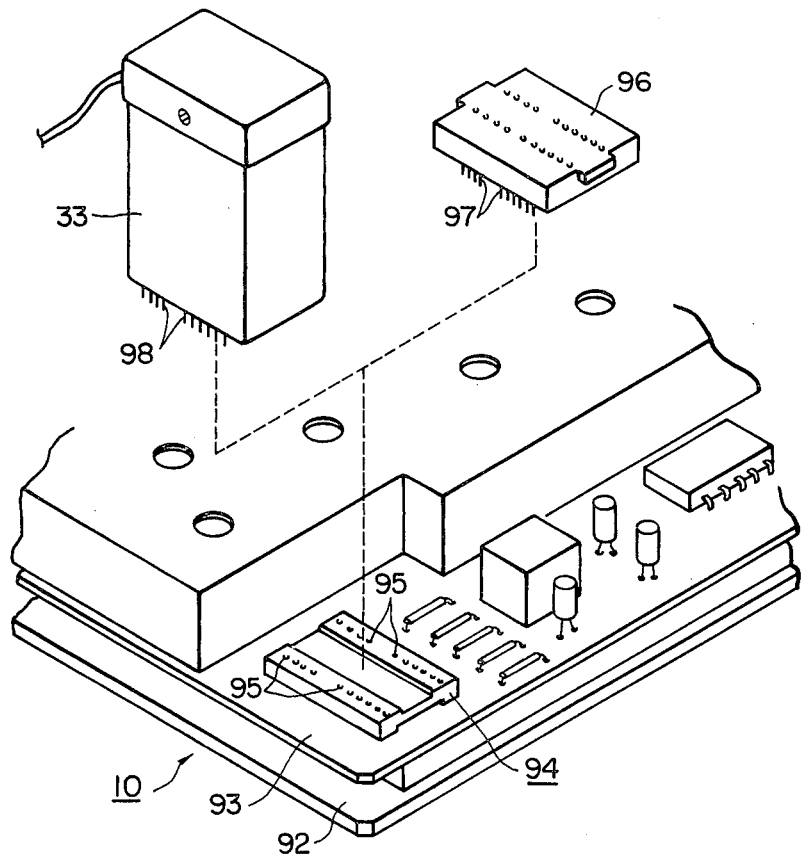
FIG. 8 is a perspective view of a portion of the interior of a terminal unit showing an address block and address setting unit installed in the terminal unit.

FIG. 8 shows the address setting action in the main unit 10 with the cover of the main unit 10 removed. A printed circuit board 93 is secured in an insulating manner onto a metallic substrate 92. An address socket 94 for determining the address of the main unit 10 is mounted at the corner of the printed circuit board 93. The address socket 94 incorporates two rows of twelve socket holes 95 opening upwardly in two rows and aligned linearly. In the normal receiving operation of television programs, an address block 96 for setting the address of the main unit 10 is engaged with the address socket 94. This address block 96 which is formed of plastic or the like, has two rows of twelve pins 97 on the lower surface. By selectively making connection between designated ones of the pins 97 inside the address block 96, a desired address is determined. The pins 97 are inserted into the socket holes 95. When the main unit 10 is tested in operation, the address block 96 is pulled out of the address socekt 74 and the address setting unit 33 is instead engaged with the address socket 94. Pins 98 project from the lower portion of the address setting unit 33. When the pins 98 are inserted into the socket holes 95, the address setting unit 33 is electrically connected to the address socket 94. The control signal from the PDM 32 connects any of the pins 98 by a switching circuit built in the address setting unit 33 wherein the address is freely settable.

The operation of this embodiment will be described.

A. "Polling pattern generator 34 (PPG)"

The operation of the PPG 34 will be described with reference to FIGS. 5 through 7.

When the power switch 79 is turned on, the power lamp 80 is lit, and power is coupled to the various operating circuits. If it is desired to use the built-in data ROM 70 or the data switch 71, the selector switch 83 is set to the "INT" position. To set the output signal level, the attenuation switches 84 are set so as to produce the desired level. For example, if an output signal level of $-38$ dB is desired, the push-button 20, 10, 5 and 3 of the attenuation switches 84 are depressed.

When the power switch 79 is turned on as described above, the address code and the data code are sequentially produced periodically with predetermined period at the connector 82. Then, the polling operation is conducted. When this type of data is outputted, the polling lamp 85 is turned on. The polling speed (or period) can be varied by turning the function knob 86 (see FIG. 6).

Operation with Data ROM 70

When the power is on as described above, the timing control circuit 73 periodically outputs a timing pulse in a predetermined period to the data ROM 70. The data ROM 70 thus applies the data stored therein at every timing pulse to the selector circuit 72. The selector circuit 72 operates to cut off the inputting of the switch data 71 and to apply only the input from the data ROM 70 to the conveyor circuit 74 which converts the NRZ code from the data ROM 76 to BPS code. The data thus converted is modulated with a predetermined frequency by the FSK signal transmitter circuit 75 and amplified. The data signal thus modulated and amplified is applied from the output terminal 76 and through the connector 82.

In the data ROM 70 is stored a plurality of sets of combinations of an address code and a command code. The sets of data are sequentially outputted, one set at every timing pulse. When all the data thus stored has been outputted from the data ROM 70, the data is repeatedly outputted starting from the initial data. Specific examples of the types of the data will be described. (The data ROM 70 is a 256×8 bit type.)

TABLE 1

| | $D_8$ | $D_7$ | $D_6$ | $D_5$ | $D_4$ | $D_3$ | $D_2$ | $D_1$ | |
|---|---|---|---|---|---|---|---|---|---|
| 00 | 0 | 0 | 0 | 0 | 0 | 0 | 0 | 0 | } Spare |
| 01 | 0 | 0 | 0 | 0 | 0 | 0 | 0 | 0 | |
| 02 | 0 | 0 | 0 | 0 | 0 | 0 | 0 | 0 | |
| 03 | 0 | 0 | 0 | 0 | 0 | 0 | 0 | 0 | — Frame |

TABLE 1-continued

| | $D_8$ | $D_7$ | $D_6$ | $D_5$ | $D_4$ | $D_3$ | $D_2$ | $D_1$ | |
|---|---|---|---|---|---|---|---|---|---|
| 04 | 1 | 1 | 1 | 1 | 1 | 1 | 1 | 1 | } $MG_1$ |
| 05 | 1 | 1 | 1 | 1 | 0 | 0 | 1 | 0 | |
| 06 | 0 | 0 | 0 | 0 | 0 | 0 | 0 | 0 | } $MP_1$ 4E |
| 07 | 1 | 0 | 0 | 1 | 1 | 1 | 1 | 1 | |
| 08 | 1 | 1 | 1 | 1 | 1 | 0 | 0 | 0 | |
| 09 | 0 | 0 | 0 | 0 | 0 | 0 | 0 | 0 | } $MP_2$ MLON |
| 0A | 1 | 0 | 1 | 0 | 1 | 1 | 1 | 1 | |
| 0B | 1 | 0 | 0 | 0 | 0 | 1 | 1 | 0 | |
| 0C | 0 | 0 | 0 | 0 | 0 | 0 | 0 | 0 | } $MP_3$ PPO |
| 0D | 1 | 0 | 1 | 1 | 0 | 1 | 1 | 1 | |
| 0E | 1 | 0 | 0 | 1 | 0 | 1 | 0 | 0 | |
| 0F | 0 | 0 | 0 | 0 | 0 | 0 | 0 | 0 | } $MP_4$ PCD |
| 10 | 1 | 0 | 1 | 1 | 1 | 0 | 1 | 1 | |
| 11 | 1 | 1 | 1 | 0 | 0 | 1 | 1 | 0 | |
| 12 | 0 | 0 | 0 | 0 | 0 | 0 | 0 | 0 | } $MP_5$ 4E |
| 13 | 1 | 0 | 1 | 1 | 1 | 1 | 0 | 1 | |
| 14 | 1 | 1 | 1 | 1 | 1 | 0 | 0 | 0 | |

TABLE 2

| | $D_8$ | $D_7$ | $D_6$ | $D_5$ | $D_4$ | $D_3$ | $D_2$ | $D_1$ | |
|---|---|---|---|---|---|---|---|---|---|
| 15 | 0 | 0 | 0 | 0 | 0 | 0 | 0 | 0 | } $MP_6$ MLOFF |
| 16 | 1 | 0 | 1 | 1 | 1 | 1 | 1 | 0 | |
| 17 | 1 | 1 | 0 | 0 | 0 | 1 | 0 | 0 | |
| 18 | 0 | 0 | 0 | 0 | 0 | 0 | 0 | 0 | } $MP_7$ 0110 |
| 19 | 1 | 0 | 0 | 1 | 1 | 1 | 1 | 0 | |
| 1A | 1 | 0 | 1 | 1 | 0 | 0 | 1 | 0 | |
| 1B | 0 | 0 | 0 | 0 | 0 | 0 | 0 | 0 | } $MP_8$ 4E |
| 1C | 1 | 0 | 1 | 0 | 1 | 1 | 1 | 0 | |
| 1D | 1 | 1 | 1 | 1 | 1 | 0 | 1 | 0 | |
| 1E | 0 | 0 | 0 | 0 | 0 | 0 | 0 | 0 | } $MP_9$ 4-0 |
| 1F | 1 | 0 | 1 | 1 | 0 | 1 | 1 | 0 | |
| 20 | 1 | 0 | 0 | 0 | 0 | 0 | 1 | 0 | |
| 21 | 0 | 0 | 0 | 0 | 0 | 0 | 0 | 0 | } $MP_9$ MLOFF |
| 22 | 1 | 0 | 1 | 1 | 0 | 1 | 1 | 0 | |
| 23 | 1 | 1 | 0 | 0 | 1 | 1 | 1 | 0 | |
| 24 | 0 | 0 | 0 | 0 | 0 | 0 | 0 | 0 | } $MP_9$ DC |
| 25 | 1 | 0 | 1 | 1 | 0 | 1 | 1 | 0 | |
| 26 | 1 | 1 | 0 | 1 | 0 | 1 | 0 | 0 | |
| 27 | 0 | 0 | 0 | 0 | 0 | 0 | 0 | 0 | } AG |
| 28 | 1 | 1 | 0 | 0 | 0 | 0 | 1 | 0 | |
| 29 | 1 | 0 | 0 | 0 | 0 | 0 | 0 | 0 | |

In this manner, the data of the address code and the command code are sequentially read out from the data ROM 70. The data contains steps sequentially numbered "00" to "29" steps. When step "29" of the data is read out, this operation is repeated. When the interval of generating the timing pulses from the timing control circuit 73 is varied by operating the function knob 86, the polling speed or period varies.

Operation with Data Switch 71

When the cover 87 of the PPG 34 is opened, the built-in switch groups 88 through 91 are accessible. With the cover 87 thus removed, the selector circuit 72 is simultaneously automatically selected and only the signal of the data switch 71 is applied to the converter circuit 74. The switches 88 through 91 can be manually set to the "H" or "L" position and the switches 88 and 89 are used to freely select the group address code, the switch 90 to set the individual code and the switch 91 to freely set the command code. (The start, index and parity codes are separately set beforehand.) The data thus set is applied to the selector circuit 72 using the timing pulse signal from the timing control circuit 73 as described above.

Operation with External Data Input

The output of the generator for generating other data is connected to the connector 81. The selector switch 83 is set to the "EXT" position. Thus, the external data input is applied directly to the converter circuit 74. The external data thus applied is outputted through the transmitter circuit. B. "Passive Data Modulator 32 (PDM)"

The operation of the PDM 32 will be described with reference to FIGS. 3 and 4.

When the switch 66 is turned on, the power lamp 67 is lit and power is supplied to the various circuits of the units. When the check number knob 68 is turned, the built-in ROM 53 and ROM 54 are selected and the stored polling list is changed. A pin plug (not shown) is connected to the address setting unit 33 by insertion thereof into the pin socket 59. The address of the mode selected by the check number knob 68 is outputted as a control signal from the pin socket 59. The PSK signal from the main unit 10 is applied to the connector 57. When the PSK signal is thus applied, the RCP LED 63 is lit indicating the reception of the PSK signal. If the PSK signal is correct, the LED 64 corresponding to GOOD is lit while if the PSK signal is in error, the LED 65 corresponding to NG is lit. The LED 60 indicates the content of the PSK signal, the LED 61 indicates the presence or absence of parity, and the LED 62 indicates the presence or absence of the additional bit (see FIG. 4).

Setting of Address

When the selector circuit 52, which is set by the check number knob 68, is operated, the selector circuit 52 selects the address number corresponding to the function to be checked to thereby output the desired address number from the address ROM 54 to the isolation buffer circuit 55 and to apply the address signal to the address output terminal 37. With the address setting unit 33 connected through a coaxial cable to the address output terminal 37 (the pin connector 59), the address signal is applied to the address setting unit 33. In response to the address signal, the address setting unit 33 sets interconnections between ones of the pins 98 (FIG. 8). Thus, since the pins 98 of the address setting unit 33 are inserted into the pin holes 95 of the address block 94, the address is set in the main unit 10 through the pins 98. When the set address number is polled, the data is applied to the main unit 10.

Setting of Data

When the address number is selected in the address ROM 54 by the selector circuit 42 as described above, the selected signal is simultaneously applied to the data ROM 53. The data corresponding to the address number is applied from the data ROM 53 to the comparator 49. That is, the address number and the data are treated as a pair. The special address number is always simultaneously outputted in combination with the special data. The address number and the content of the data are equal to the address number and the answer data corresponding to the following command data generated by the PPG 34.

Reception of Data

A command is applied, as shown in FIG. 2, from the PPG 34 through the PDM 32 to the main unit 10. The command contains an address number and data in combination as described above. A plurality of types of the commands are sequentially outputted. When the final command of a series of the commands is outputted, the initial command is again outputted starting from the first command. More particularly, several types of commands are continuously and repeatedly sequentially outputted from the PPG 34. Since the address number is set to a special value by the address setting unit 33 as described above, the main unit 10 starts operation upon reception of a particular one of the addresses applied from the PPG 34, reads the data followed by the address number and transmits an answering PSK signal toward the center 1 and accordingly toward the PDM 32. The PSK signal is applied from the input terminal 36 (the connector 58) to the signal splitter 38 and from these applied to the bandpass filter 39. (The FSK signal corresponds to the high frequency and the PSK signal to the low frequency.) The PSK signal, after passing though the bandpass filter 39 is detected by the signal detector 40, and is then applied to both the high-pass filter 41 and the low-pass filter 42. The output signal from the high-pass filter 41 is applied to both the wave shaping circuit 43 and the clock generator 44. The converter circuit 45 converts the BPS code into the NRZ code and to applies the NRZ code to the serial-to-parallel converter circuit 46. The PSK signal is applied to the clock generator 44 which detects and outputs only the clock information in the signal. The clock generator 44 thus applies the clock signal thus produced to both the converter circuit 45 and the serial-to-parallel converter 46 which use the clock signals to time their operations. With the clock signal thus applied to the converter circuit 45, the PSK signal is applied to the converter circuit 46 at every clock pulse.

The data latch circuit 48 receives the signal from the converter circuit 46 and holds the PSK signal of a predetermined bit-number parallel signal (for example, eight-bit parallel signal). The output of the data latch circuit 48 is displayed by the monitor circuit 50. The latch control circuit 48 detects effective sections of the data and thus to control the data rewriting operation in the latch circuit. The output of the data latch circuit 48 is applied to the comparator 49. The comparator 49 receives the preset data from the data ROM 53, compares the output from the data latch circuit 48 with the preset data from the data ROM 53, and applies the compared result output to the display unit 51. If the two signals are the same, it is indicated that the main unit 10 is operating normally by lighting the GOOD LED 64. If, however, the two signals are different, it is indicated that the main unit 10 is operating erroneously by lighting the NG LED 65.

With such a series of operations, it is determined whether or not a particular function of the main unit 10 is operating normally or erroneously by the special address and data set by the selector circuit 52. Accordingly, when the selector circuit 52 is operated to set sequentially the designated address and the data corresponding to the designated address, almost all the functions of the main unit 10 are tested.

Figure 9:
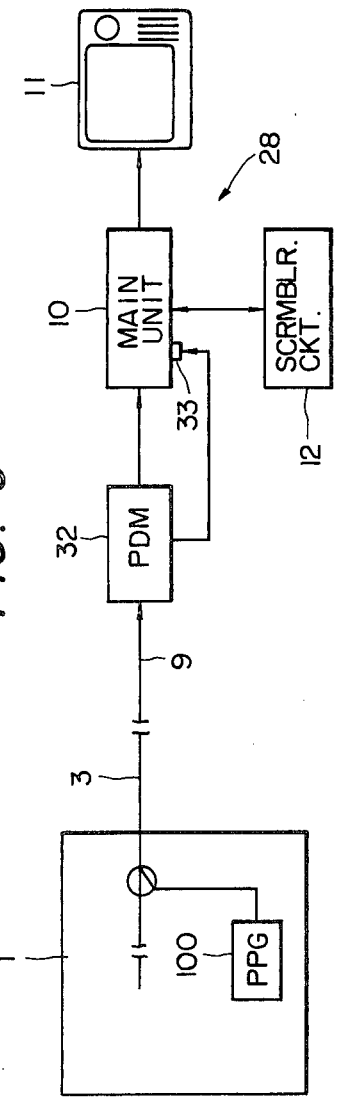
FIG. 9 is a structural view showing an alternate installation of the polling pattern generator.

FIG. 9 is a block diagram showing a system in which the functions of the terminal units 28 can be tested by the center 1 and the PDM 32.

The center 1 incorporates a polling pattern generator circuit 100 connected to a main cable 3. The generator circuit 100 stores a plurality of address numbers and a plurality of data for checking the operating state of the terminal units 28 corresponding to the address numbers. The data corresponding to the address numbers is periodically applied to the main cable 3. The polling pattern signals are fed during an idling time for polling. (This time has a duration of 5 to 10 seconds.) The address in the polling pattern signal is not the one used in the address of plurality of terminal units 28, but is a special address not actually used so that a malfunction does not occur. The PDM 32 is connected to the branch lines 9 from by the main cable 3. The main unit 10 is connected to the output of the PDM 32. An address setting unit 33 is connected to the PDM 32 as described above. The address setting unit 33 is connected to the address socket of the main unit 10. Since in this embodiment the center 1 periodically outputs the checking address and the data during the idling time of polling, when the address to be checked by the PDM 32 is set, the address setting unit 33 defines the address number of the main unit 10. Whe the set address polling pattern signal is transmitted to the main unit 10, the main unit 10 outputs a PSK signal corresponding to the data to the PDM 32 and the PDM 32 analyzes the PSK signal in the same manner as described above.

In the polling pattern generator described above, the polling pattern is generated using a simple circuit arrangement and without using a large-size computer. Moreover, since the generator of the invention is portable, it can be operated in the vicinity of the terminal units without moving the terminal unit as well as being used to test and repair terminal units in a factory or repair facility.

What is claimed is:

1. A terminal unit checking system for a CATV system having a single center and a number of terminal units connected to said single center for transmitting television program through cables to said terminal units, comprising: polling pattern generator means for periodically generating polling pattern signals, each polling pattern signal having a specific address code for calling a corresponding terminal unit and a command code for requesting a designated answer form the called terminal unit; passive data monitor means for comparing an up data signal outputted from said terminal unit in response to said command code with said designated answer requested by said command code and for judging an operational state of said terminal unit from a resultant comparison output, said passive data monitor comprising means for arbitrarily setting an address code in said terminal unit, and wherein said passive data monitor means is connected between said center and said terminal unit and between said polling pattern generator means and said terminal unit and wherein, when an address code of a polling pattern signal from said polling pattern generator is the same as an address code set in said terminal unit by said address setting means to said passive data means, an up data signal outputted from said terminal unit in response to said command code is applied to said passive data monitor means and therein a designated answer requested by said command code and said up data signal thus outputted from said terminal unit are compared to determine whether an operational state of said terminal unit is acceptable.

2. The terminal unit checking system of claim 1 further comprising trap means coupled between said polling pattern generator means and said center and mixer means coupled between said polling pattern generator means and said passive data monitor means.

3. The terminal unit checking system of claim 1 or 2 wherein said address setting means comprises a multi-pin connecter coupled through a cable to said passive data monitor, said multi-pin connector being adapted to connect to an address circuit of said terminal unit.

* * * * *